Jan. 17, 1928.
R. CRAIG
SCALE
Filed May 29, 1923
1,656,267
3 Sheets-Sheet 1
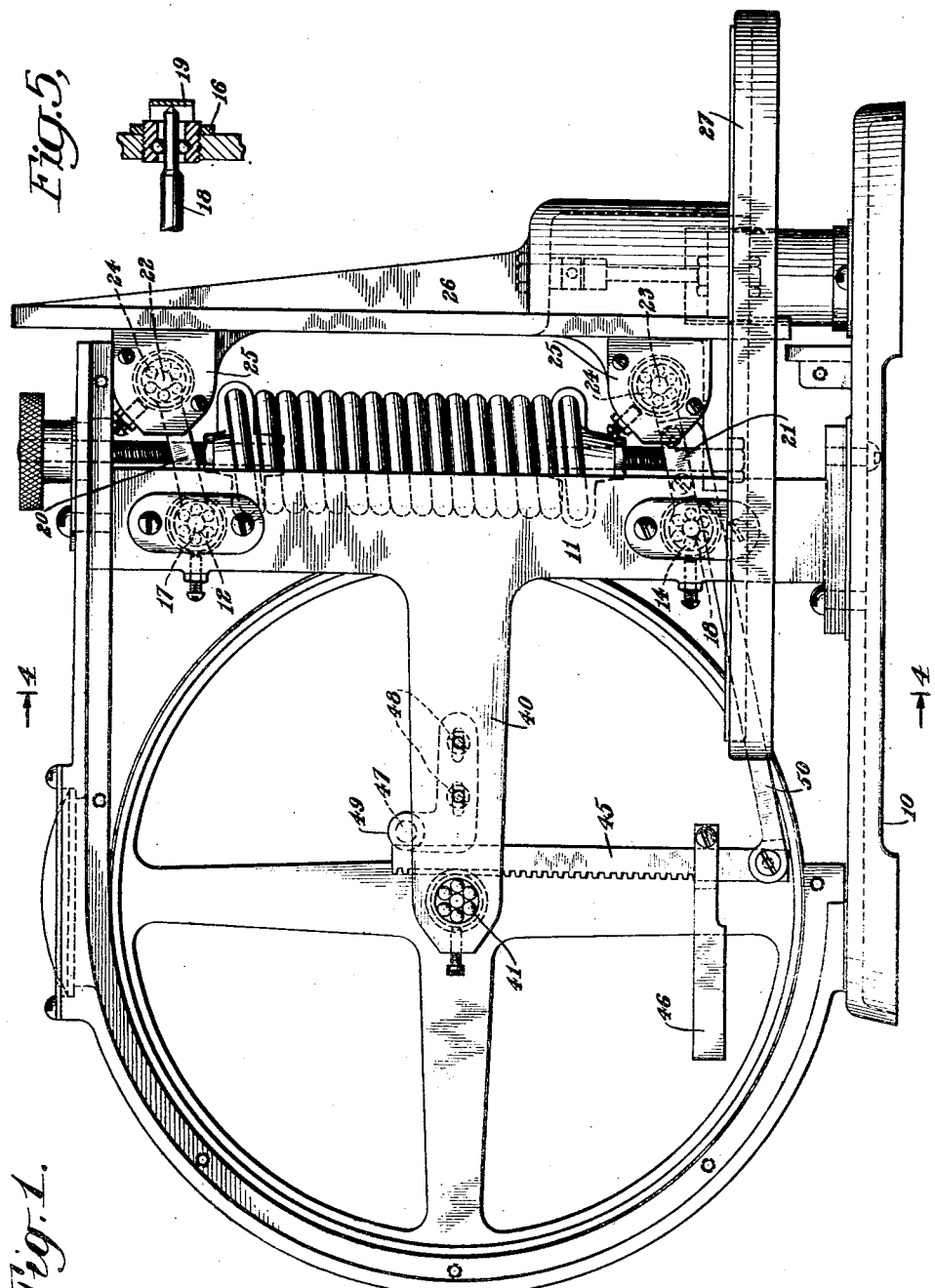
Inventor
Robert Craig,
By his Attorneys
Cooper, Kerr & Dunham

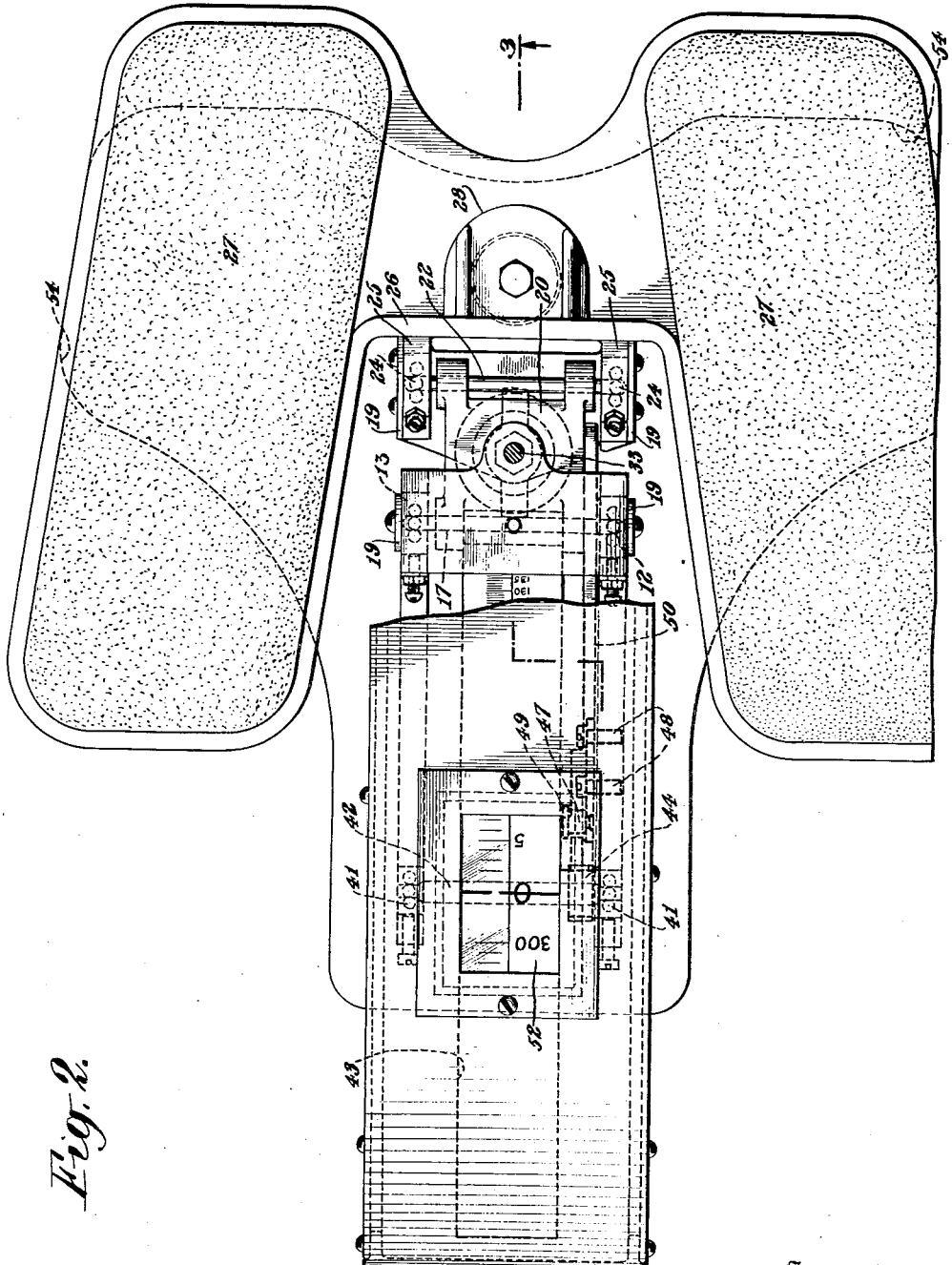

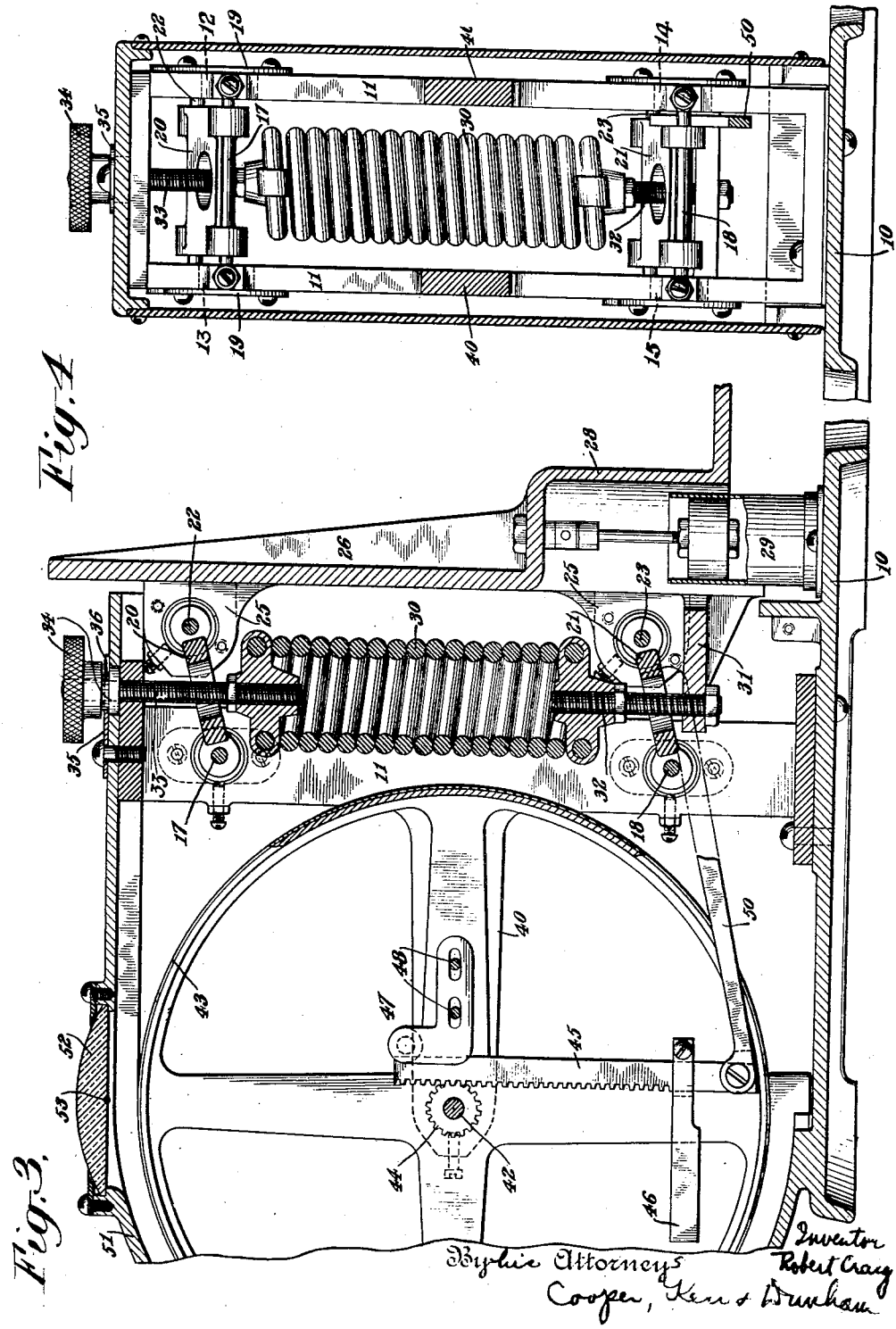

Patented Jan. 17, 1928.

1,656,267

UNITED STATES PATENT OFFICE.

ROBERT CRAIG, OF DAYTON, OHIO, ASSIGNOR TO DAYTON SCALE COMPANY, OF DAYTON, OHIO, A CORPORATION OF NEW JERSEY.

SCALE.

Application filed May 29, 1923. Serial No. 642,191.

This invention relates to an improved weighing scale of the spring type and is particularly directed to the provision of a scale which will be both rugged and substantial and at the same time simple and inexpensive to manufacture.

The preferred embodiment of my invention shows a weighing scale of the so-called personal weigher type which is particularly adapted for household use. These scales have commonly been called bathroom scales, and it is one of the objects of the present invention to improve the construction of such scales to the general end that more accurate weighing may be effected thereby.

A further object resides in the provision of a scale of the type of the so-called bath scale, having relatively low load supporting members whereby the chances of the scale being tipped over when the user steps thereon is obviated. The tipping of such household bathroom scales heretofore has been due to the location of the platform at the top of the scale structure and by the provision of my improvements the possibility of such tipping, however careless the user may be in stepping on the scale, is obviated.

A further object is directed to an improved drum indicating structure.

Other objects and advantages will be pointed out in the accompanying specification and claims, and shown in the drawings in which Fig. 1 is a side view of the scale with the housing removed;

Fig. 2 is a top plan view of the same;

Fig. 3 is a sectional view taken substantially on line 3—3 of Fig. 2;

Fig. 4 is a sectional view taken on line 4—4 of Fig. 1;

Fig. 5 is a detail view of one of the bearings.

In more detail 10 is the base of the scale, which supports a box-like frame 11. Suitably disposed in the frame are ball bearings 12, 13, 14 and 15. These bearings are preferably of the type shown in Fig. 5, in which the bearings are secured in position by threading the outer race member and in which the latter is clamped in position by a lock nut 16. If desired the bearing may be locked by a suitable set screw. The bearings 12 and 13 receive a shaft 17 and bearing 14—15 receives a similar shaft 18. Suitable steel pieces 19 prevent the endwise shifting of the shafts. Shafts 17 and 18 pass through check links 20 and 21. These links at their opposite ends receive shafts 22—23 which are supported in suitable ball bearings 24 carried in lugs 25 on a load supporting frame 26. This load supporting frame at its bottom is provided with foot rests 27. These foot rests are comparatively close to the base whereby the tendency of the apparatus to tip when stood upon is minimized. The load frame is extended as shown at 28 to provide clearance for a dash pot 29 suitably supported upon the base 10. The plunger of this dash pot is connected by a proper link connection to the frame 26.

Load counterbalance.

To counterbalance the load, I provide a spring 30 which spring at its lower end is connected to a lug 31 on the frame by means of a threaded bolt 32, this bolt passing through a suitable clearance opening in the lower check 21. The upper end of the spring connects to a threaded stud 33 which passes through an aperture in the upper check 20 and the frame 11 and into a threaded adjusting nut 34. By turning this nut the scale may be adjusted for zero. To prevent displacement of the parts when a load is suddenly removed from the scale, a forked steel plate 35 is provided which fits into a groove 36 in the nut 34. The plate 35 is secured in place by a suitable screw.

Indicating devices.

The frame 11 is provided with laterally extending arms 40 which at their ends receive bearings 41 which in turn support a shaft 42. This shaft has secured to it an indicating drum 43 of light weight, of the type commonly used in computing drum scales. The chart, however, is graduated only with weight graduations. For rotating the chart, a pinion 44 is fixed upon the shaft. A rack 45 is enmeshed with the pinion by means of an enmeshing weight 46. The rack is prevented from becoming unmeshed by means of an adjustable roller stop 47 which is carried by one of the arms 40. Suitable screws 48 permit the in or out adjustment of the roller stop. The roller itself is also provided with a flange 49 on its periphery to prevent excessive lateral shifting of the rack. To actuate the rack up and down an arm 50 is provided which arm extends to and connects with the lower check link 21.

A suitable chart housing 51 encloses the chart and at the top is provided with a reading window preferably provided with a magnifying glass 52. Any desired index may be used. As here shown the reading index comprises a line 53 inscribed upon the glass but if desired a wire indicator of the usual type could be employed.

The base 10 of the scale is provided with lateral extensions 54 which extend out under the platform members 27 (see Fig. 2). This arrangement of base together with the low disposition of the parts 27 with respect to the center of gravity of the device as a whole prevents the apparatus tipping over when the user steps on the platform with one foot.

The operation of the scale will be readily apparent. The application of a load causes the distention of the spring proportionally to the applied load. Both check links rock proportionally to the amount of depression of the platform which is proportional to the distention of the spring. Consequently the arm 50 is rocked proportionally to the load and the indicator is turned to a corresponding extent.

The drum type of indicator permits comparatively wide spacing of the graduations thereby facilitating reading of the weight, which is difficult with ordinary bath-room scales due to the fact that the eyes of the person weighing himself are a considerable distance from the weight indicator. Furthermore the drum indicator is more readily protected against breakage than with the usual dial type where a large circular glass plate is provided.

What I claim is—

1. A weighing scale comprising a supporting frame, a pair of check links pivotally carried thereby, a load support pivotally supported upon said check links and having the load supporting portions thereof disposed adjacent the plane of the lower check link on both sides thereof, a lug upon said load support adjacent the lower end thereof, a load counterbalancing spring connected to said lug at one end and supported at the other end by the aforesaid frame, a rotary drum type indicator supported in said frame, a rack and pinion to operate the same, a motion multiplying arm carried by one of the check links for actuating said rack and a magnifying device for displaying the indications on said indicator to a person standing on the load support.

2. A weighing scale of the portable bath-room type comprising a supporting base, a pair of check links pivotally connected thereto and including an upper link and a lower link, automatic load counterbalancing means, a weight indicating means readable from a position directly above said indicating means, a pair of foot rests disposed adjacent the base and operatively connected with the weight indicating means, the check links and to said load counterbalancing means, and means to magnify the indications on said indicating means.

3. A weighing scale including a supporting frame, a pair of check links pivotally supported at one end thereof by said frame, a load support pivotally supported upon the other ends of said links, a load counterbalancing spring adjustably connected to said frame and load support, a drum indicator horizontally journalled in said frame and having reading graduations upon the outer periphery to permit direct vertical reading of its position of displacement, a rack and pinion for operating the same and an operating connection intermediate the rack and one of said check links and means to disclose an enlarged image of the indications on said indicator.

4. A weighing scale comprising a frame, a pair of apertured check links pivotally supported at one end thereby, a load support pivotally mounted upon the opposite ends of said check links, said load support having a load supporting portion thereof disposed below the plane of the lower of said check links, a load counterbalancing spring disposed between said links and having an adjustable support extending upwardly to said frame through the aperture in one link and having an adjustable connection extending downwardly to the load support through the aperture in the other link, an indicator, and a magnifying device for displaying the amount of the applied load.

5. A personal weighing scale comprising a rotatable drum type indicator having a horizontal axis and with graduations upon its periphery and adapted to be read by a person standing upon the scale, a load supporting platform adjacent the base of the scale and adapted to receive the feet of the person being weighed, a supporting frame, an automatic load counterbalancing means connected thereto and to said platform, operating connections from said platform to said rotatable drum indicator for variably displacing the same about its horizontal axis under the control of the automatic load counterbalancing means, and a device to optically magnify the indications on said indicator.

6. A weighing scale comprising a frame, upper and lower pairs of ball bearings carried thereby, check links supported at one end by said bearings, a load support having a lower portion adjacent the plane of the lower check link for supporting the applied load, upper and lower ball bearings carried by said load support and pivotally supporting the other ends of said check links, automatic load counterbalancing means connected to said load support for counterbalancing the applied load, a drum type of weight indicator for indicating the automatically counterbalanced load, a magnifying device and an indicator operating means comprising motion multiplying devices operatively associated with one of the check devices, said indicator being readable through the aforesaid magnifying device.

7. A weighing scale comprising a frame, upper and lower pairs of ball bearings in said frame, a load support, upper and lower pairs of ball bearings in said load support, upper and lower check links connecting said frame and load support, and pivotally mounted in said upper and lower pairs of bearings respectively, said load support having the load supporting portions thereof disposed adjacent the plane of the lower check link and on both sides thereof, a spring load counterbalancing means connected to said frame and load support, a weight indicator displaced in accordance with the distention of the spring for indicating the applied load, a magnifying device and an indicator operating means comprising motion multiplying devices operatively associated with one of the check devices, said indicator being readable through the aforesaid magnifying device.

8. A weighing scale comprising a frame, upper and lower pairs of ball bearings in said frame, a load support, upper and lower pairs of ball bearings in said load support, upper and lower check links connecting said frame and load support and pivotally mounted in said upper and lower pairs of bearings respectively, said load support having the load supporting portions thereof disposed adjacent the plane of the lower check link and on both sides thereof, automatic load counterbalancing means connected to the frame and load support, a drum type weight indicator rotatably mounted in said frame, means for driving said drum indicator in accordance with the displacement of the automatic counterbalance, and a magnifying device to display the indications on said indicator.

9. A weighing scale comprising a frame, upper and lower pairs of ball bearings in said frame, a load support, upper and lower pairs of ball bearings in said load support, upper and lower check links connecting said frame and load support and pivotally mounted in said upper and lower pairs of bearings respectively, said load support having the load supporting portions thereof disposed adjacent the plane of the lower check link and on both sides thereof, automatic load counterbalancing means supported by said frame and connected to the load support, a displaceable weight indicator, connections between said indicator and the lower check link including an arm fastened to said check link for displacing the indicator in accordance with the displacement of the check and the amount of the applied load, and a magnifying device to display the indications on said indicator to a person standing on the load support.

10. A weighing scale comprising a frame, upper and lower pairs of ball bearings in said frame, a load support, upper and lower pairs of ball bearings in said load support, upper and lower check links connecting said frame and load support and pivotally mounted in said upper and lower pairs of bearings respectively, said load support having the load supporting portions thereof disposed adjacent the plane of the lower check link and on both sides thereof, automatic counterbalancing means connected to said load support, a weight indicator, a rack and pinion device for displacing said indicator in accordance with the automatically counterbalanced load, a dash pot for arresting vibrations, said dash pot having a moving part thereof connected to said load support, and a magnifying device to display the indications on said indicator to a person standing on the load support.

11. A personal weighing scale comprising a frame, a base, a load supporting platform adjacent said base and on both sides thereof, a pair of upper and lower check links pivotally connecting said frame and platform, automatic load counterbalancing means connected to the frame and platform, a drum type weight indicator horizontally and rotatably mounted in said frame, means for driving said drum type indicator in accordance with the displacement of the automatic counterbalance, and a device to optically magnify the indications on said indicator.

In testimony whereof I hereto affix my signature.

ROBERT CRAIG.